United States Patent
Hals et al.

(10) Patent No.: US 6,920,505 B2
(45) Date of Patent: Jul. 19, 2005

(54) METHOD AND APPARATUS FOR DETERMINING A NAVIGATION PATH FOR A VISITOR TO A WORLD WIDE WEB SITE

(75) Inventors: Erik D. Hals, Peekskill, NY (US); George M. Nimeh, New York, NY (US); Donald L. Sierra, New Rochelle, NY (US)

(73) Assignee: Ask Jeeves, Inc., Oakland, CA (US)

( * ) Notice: Subject to any disclaimer, the term of this patent is extended or adjusted under 35 U.S.C. 154(b) by 670 days.

(21) Appl. No.: 09/737,197

(22) Filed: Dec. 14, 2000

(65) Prior Publication Data

US 2002/0078230 A1 Jun. 20, 2002

(51) Int. Cl.⁷ .............................................. G06F 15/16
(52) U.S. Cl. ..................... 709/238; 709/200; 709/201; 709/202; 709/217; 709/218; 709/219; 709/223; 709/224; 709/238; 707/2; 707/3; 707/4; 707/5; 707/10
(58) Field of Search ............................ 709/200–203, 709/217–219, 223–224, 229, 238; 707/2–5, 10; 713/185; 235/382, 375

(56) References Cited

U.S. PATENT DOCUMENTS

| | | | |
|---|---|---|---|
| 5,305,195 A | 4/1994 | Murphy | 705/1 |
| 5,572,643 A | 11/1996 | Judson | 709/218 |
| 5,577,241 A | 11/1996 | Spencer | 767/5 |
| 5,724,521 A | 3/1998 | Dedrick et al. | 705/26 |
| 5,737,619 A | 4/1998 | Judson et al. | 707/500 |
| 5,774,170 A | 6/1998 | Hite et al. | 348/9 |
| 5,794,210 A | 8/1998 | Goldhaber et al. | 705/14 |
| 5,848,397 A | 12/1998 | Marsh et al. | 705/14 |
| 5,918,014 A | 6/1999 | Robinson | 709/219 |
| 5,933,811 A | 8/1999 | Angles et al. | 705/14 |
| 5,937,392 A | 8/1999 | Alberts | 705/14 |
| 5,946,646 A | 8/1999 | Schena et al. | 702/177 |
| 5,948,061 A | 9/1999 | Merriman et al. | 709/219 |
| 5,959,623 A | 9/1999 | Van Hoff et al. | 345/333 |
| 5,983,199 A | 11/1999 | Kaneko | 705/26 |
| 5,983,227 A | 11/1999 | Nazem et al. | 707/10 |
| 5,983,273 A * | 11/1999 | White et al. | 709/229 |
| 5,991,756 A | 11/1999 | Wu | 707/3 |
| 5,996,006 A | 11/1999 | Speicher et al. | 709/218 |
| 6,006,197 A | 12/1999 | d'Eon Christopher et al. | 705/10 |
| 6,006,225 A * | 12/1999 | Bowman et al. | 707/5 |
| 6,064,967 A | 5/2000 | Speicher et al. | 705/1 |
| 6,073,105 A | 6/2000 | Sutcliffe et al. | 705/1 |
| 6,073,135 A | 6/2000 | Broder et al. | 707/100 |
| 6,128,651 A | 10/2000 | Cezar | 709/217 |
| 6,128,663 A | 10/2000 | Thomas | 709/228 |
| 6,157,946 A | 12/2000 | Itakura et al. | 709/217 |
| 6,161,127 A | 12/2000 | Cezar et al. | 709/203 |
| 6,321,228 B1 * | 11/2001 | Crandall et al. | 707/10 |
| 6,470,383 B1 * | 10/2002 | Leshem et al. | 709/223 |

\* cited by examiner

*Primary Examiner*—Ario Etienne
*Assistant Examiner*—Yves Dalencourt
(74) *Attorney, Agent, or Firm*—Blakely, Sokoloff, Taylor & Zafman; Stephen M. De Klerk

(57) ABSTRACT

A method and apparatus for determining a navigation path for a visitor to a Web site, the determination being based, at least in part, on one or more search terms or keywords supplied by the visitor when conducting a search at the Web site are provided. The method and apparatus allow a Web site to dynamically determine one or more navigation path options to impose on a visitor to the Web site based on one or more search terms supplied by the visitor. The method includes a step during which one or more search terms are received directly or indirectly from a visitor to a Web site; a step during which a navigation path is determined from a set or plurality of navigation paths based, at least in part, on one of the search terms received during the previous step; and a step during which the visitor's navigation in the Web is directed in accordance with the determination made.

20 Claims, 8 Drawing Sheets

| Travel | Neutral | Cartoon |
|---|---|---|
| −3 | 0 | +3 |
| Orlando | Mickey Mouse | Cartoon |
| Florida | Disney | Film |
| Hotel | Fun | Animation |
| Ticket | Entertainment | Character |
| Ride | Studio | Movie |

| Banned | Mitigating | Supporting | Close | Definite |
|---|---|---|---|---|
| -100 | -5 | +1 | +9 | +50 |
| Teen | Health | Pictures | Sex | Topless |
| Kid | Cancer | Photos | Nude | Erotica |
| School | Education | Video | Naked | Stripper |
| Prostitute | Therapy | Actress | Erotic | Pornography |
| Child | Diagnosis | Actor | Undress | Xrated |

METHOD AND APPARATUS FOR DETERMINING A NAVIGATION PATH FOR A VISITOR TO A WORLD WIDE WEB SITE

BACKGROUND OF THE INVENTION

1. Field of the Invention

This invention relates generally to a method and apparatus for determining one or more navigation path options for a visitor to a World Wide Web site and, more particularly, to a method and apparatus for determining one or more navigation path options provided to the visitor or selected by the World Wide Web site based on search or query terms provided by the visitor.

2. Description of the Prior Art

The World Wide Web (the "Web") provides a breadth and depth of information to users. Typically, a user accesses portions of the information by visiting a World Wide Web site ("Web site"). For example, a user interested in learning more about the history and collection National Gallery of Art in Washington, D.C., USA, may visit its Web site (www.nga.gov). A user desiring to learn more about the products available at Nordstoms may visit the company's web site at www.nordstoms.com.

Companies and merchants typically develop and operate web sites to make their information about themselves and their goods and services more readily available to potential customers or other interested parties. Likewise, government institutions and agencies, universities, libraries, non-profit organizations, etc. also develop and operate Web sites to make information more easily available to the public.

Due to the rapid growth of the Web and the number of Web sites accessible via the Web, it may be difficult for a user looking for information about a particular topic to determine if a Web site exists that contains such information, which Web site to go to, or what the Uniform Resource Locator (URL) is for a web site of interest. As a result of a desire by users to search for relevant Web sites related to the users' topics of interests, some Web sites provide search engines or other capabilities that allow users to provide one or more search terms or keywords. For example, the Web site provided by iWon, Inc., of Irvington, N.Y., USA, provides a search capability on the home page of its Web site at www.iwon.com.

Once a user enters one or more search terms or keywords, the search engine provides search results based on the search terms or keywords. Typically such search results include a list or one or more Web sites or other locations or URLs that may be related to the search terms or keywords. The list may include one or more links to the Web sites, locations, URLs, etc. in search results that the user can select or "click" on. Thus, the user can decide which navigation path to follow by deciding which of the Web sites, locations, URLs, etc. to go to.

Unfortunately, conventional search engines available at Web sites do not direct navigation path options that may be automatically provided or implemented by the Web sites, or selected by a visitor to the Web sites who has entered one or more search terms or keywords into the search engines. Thus, despite the state-of-the-art in Web sites and search engines, there remains a need for a method and apparatus for determining navigation path options available to a visitor to a Web site based on the search terms or keywords supplied by the visitor.

SUMMARY OF THE INVENTION

Accordingly, it is an object of the present invention to provide a method and apparatus for selecting from one or more navigation path options available to a Web site for directing a visitor to a Web site, the selection of the navigation path being based, at least in part, on the search terms or keywords supplied by the visitor. In addition, the method and apparatus of the present invention allow a Web site to dynamically determine a navigation path to impose on a a visitor to the Web site based on one or more search terms or keywords supplied by the visitor. In some embodiments, the method and apparatus of the present invention also may allow search results presented to a visitor to a Web site to be varied based on one or more search terms or keywords supplied by the visitor.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, a method for directing navigation of a visitor to a World Wide Web site includes receiving one or more search terms from the visitor to the World Wide Web site, determining a navigation path based, at least in part, on the search terms, and directing the visitor along the navigation path.

Also to achieve the foregoing and other objects and in accordance with the purposes of the present invention, as embodied and broadly described herein, a system for directing navigation of a visitor to a World Wide Web site includes a memory, a communication port, and a processor connected to the memory and the communication port, the processor being operative to receive one or more search terms from the visitor to the World Wide Web site, determine a navigation path based, at least in part, on the search terms, and direct the visitor along the navigation path.

In another embodiment of an apparatus in accordance with the present invention, an apparatus for directing navigation of a visitor to a World Wide Web site includes means for obtaining one or more search terms from the visitor to the World Wide Web site, means for selecting a navigation path based, at least in part, on the search terms, and means for establishing the navigation path for the visitor.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings:

FIG. 4 is an illustration of a database or table of search terms that may be used during the determine navigation path step of the flowchart of FIG. 1;

FIG. 6 is a third illustration of a database or table of search terms that may be used during the determine navigation path step of the flowchart of FIG. 1;

DETAILED DESCRIPTION OF THE EMBODIMENTS

Figure 1:
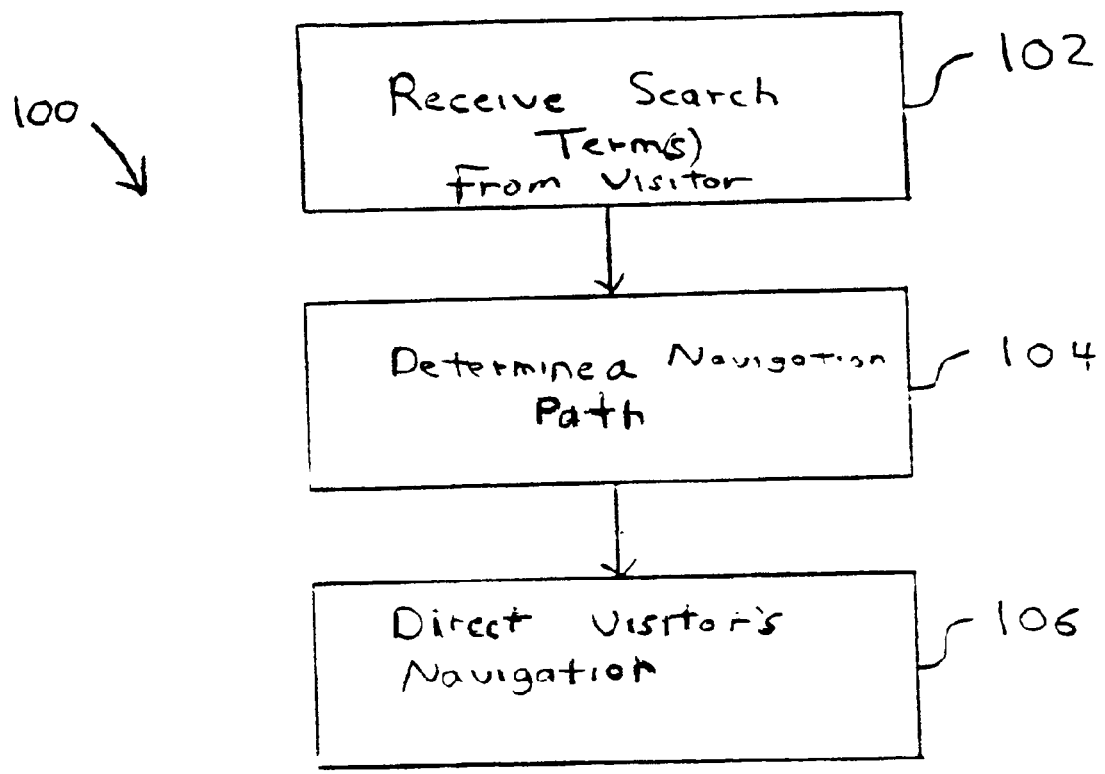
FIG. 1 is a flowchart of a first embodiment of a method in accordance with the present invention.

A first embodiment 100 of a method in accordance with the principles of the present invention is illustrated in FIG. 1. The method 100 allows a visitor (also referred to as a "user") to a Web site using a search capability or feature on the Web site to enter one or more search terms or keywords. The Web site may determine what Web page or window to provide or serve next the visitor based on the search terms. For example, a visitor interested in finding Web sites having hotel and restaurant information for Paris, France, may enter the terms "Paris" and "travel" into a search engine. The Web site may have an entire Web page of information devoted to Paris, France, and may simply display or serve such Web page to the visitor as a result of the visitor using the search term "Paris." If the visitor had entered the search term "France" instead of "Paris", the Web site may have redirected the user to a different Web page, another Web site, etc. or provided a list of Web sites that contain information on travel to and in France. Thus, the method 100 allows the Web site to vary the visitor's navigation path on the Web site and to other parts of the Web based on the search terms entered by the visitor. Information on search engines, search capabilities and search technology can be found in Michael S. Roebuck, A Beginner's Guide to Search Engine Placement and Ranking (2000); Paul J. Bruemmer, #1 Search Engine Primer (1999); Randolph Hock and Paula Berinstein, The Extreme Searcher's Guide to Web Search Engines: A Handbook for the Serious Searcher (1999); and Wes Sonnenreich, Web Developer.com Guide to Search Engines (1999), the contents of all of which are incorporated herein by reference. The method 100 illustrated in FIG. 1 includes a step 102 during which one or more search terms (also referred to as "keywords") are received directly or indirectly from a visitor to a Web site; a step 104 during which a navigation path is determined or otherwise selected based, at least in part, on one of the search terms received during the step 102; and a step 106 during which the visitor's navigation in the Web is directed in accordance with the navigation path determination made during the step 104. The navigation path selected during the step 104 will typically be one of a plurality of navigation paths associated with a set of one or more search terms. The use of different search terms by a visitor, or the receipt of different search terms during the step 102, may result in different navigation paths being selected during the step 104 and implemented during the step 106.

Typically, after search results are received during the step 102 from a visitor conducting a search on a Web site, the navigation path selected during the step 104 will cause one of at least three different things to happen: (1) a jump page will automatically be served to the visitor; (2) the visitor will automatically be directed to a new Web site; or (3) the visitor will automatically be directed to or served a new Web page of the same Web site on which the visitor is conducting the search. When jump page is served to the visitor, the jump page may include a link to a new Web site, a link to a Web page on the same Wide Web site on which the visitor is conducting the search, a link to filtered search results (which may be provided by or on the same Web site or a different Web site), or a link to unfiltered search results (which may be provided by or on the same Web site or a different Web site). Filtering of search results may occur when, for example, a Web site does not provide certain search results to a visitor conducting a search via the Web site, even though the Web site may contain or have access to such search results. In a more specific example, a Web site may filter pornographic or obscene materials from adult oriented content returned as search results by the Web site when a Web site conducts a search using the search terms "adult" and "magazine."

As an example of one implementation of the method 100, a server or controller operating or implementing the method 100, and hosting a Web site having a search capability, may receive search terms "Mickey Mouse" and "Cartoon" from a visitor to the Web site. The server will receive the search results during the step 102. During the step 104, the server or controller may determine that the visitor is interested in cartoon characters. As a result of such determination, the server may select to serve a special cartoon oriented search results Web page to the visitor. During the step 106, the Web site may provide the special cartoon oriented search results Web page to the visitor, the Web page including a list of links pointing to one or more other Web sites that contain Mickey Mouse cartoons or information about Mickey Mouse cartoons or the Mickey Mouse cartoon character. If the server or controller receives the search terms "Florida" and "Disney" from a visitor during the step 102, the server or controller may determine that the visitor is interested in Walt Disney World in Orlando, Fla. As a result of such determination, the server may select to direct the visitor to a travel oriented search results Web site devoted to information about Walk Disney World. During the step 106, the server or controller may automatically direct the visitor to the new and different Web site.

As can be seen by the previous examples, the server implementing the method 100 determines the navigation path of the visitor based on the search terms entered by the visitor. The visitors navigation path through the Web is a direct result of the search conducted by the visitor on the Web site. In the first example, the visitor is directed to a Web page on the Web site on which the visitor is conducting the search. The Web page contains links to other Web sites that may be of interest to the visitor. The selection and ordering of the links or other search results may be done in lot of ways and the method 100 is not limited in any way to how the links or other search results are selected and/or ordered, although the method and apparatus of the present invention may be used in the selection and ordering of search results. In the second example, the visitor is directed to a new Web site altogether. The choice whether to automatically direct the visitor conducting the search to the travel oriented web page or to the new Web site is based on the search terms provided by the visitor.

The method and apparatus of the present invention allow a Web site to direct different visitors along different navigation paths depending on variances in searches conducted by the visitors. As a result, an additional level of control can be provided to a visitor conducting a search or to a Web site providing search results to a visitor conducting a search. In addition, a Web site may exercise discretion or control over how it directs a visitor conducting a search. Furthermore, the method and apparatus of the present invention may allow a Web site to make assumptions about search terms entered by a visitor to provide the most meaningful search results to the visitor. These and other advantages of the method and apparatus of the present invention will be discussed in more detail below. In addition, the method 100 and each of the steps 102, 104 and 106 will be discussed in more detail below.

Figure 2:
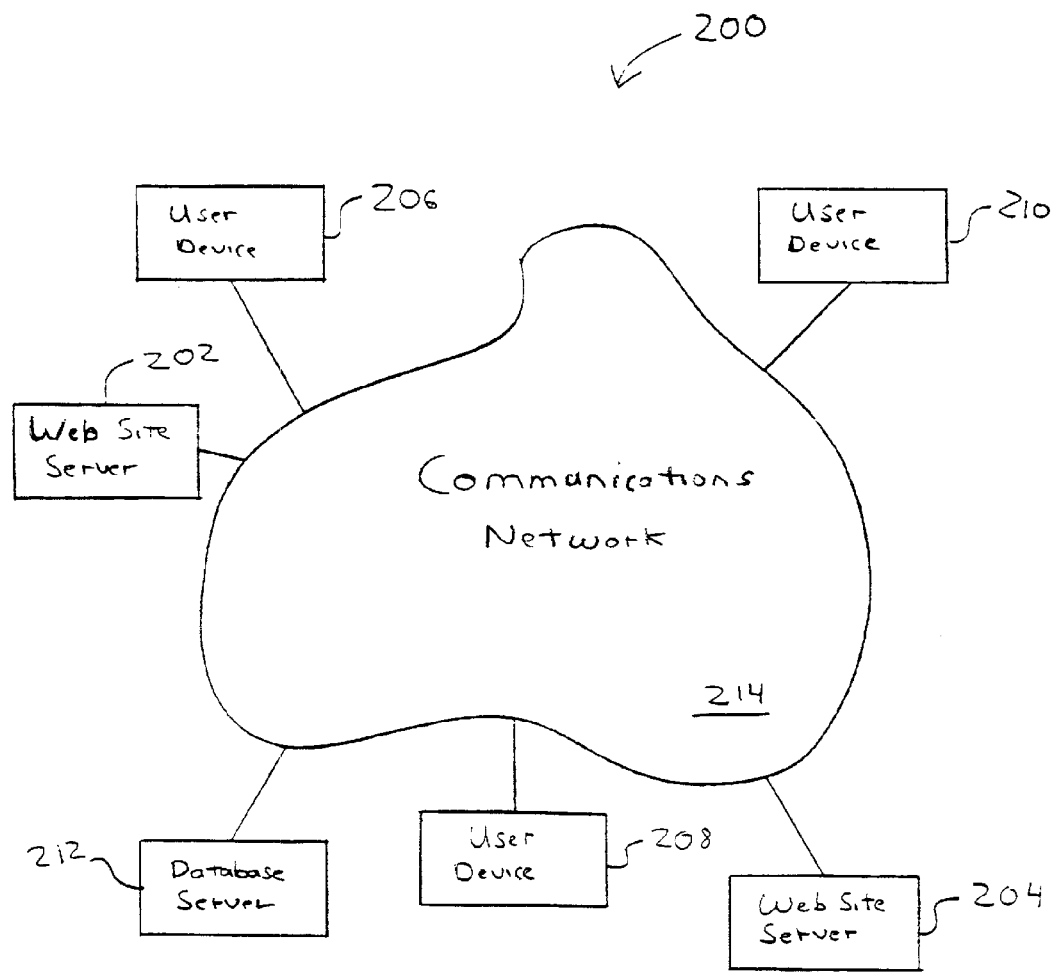
FIG. 2 is a block diagram of system components for an embodiment of an apparatus usable with the method of FIG. 1.

Now referring to FIG. 2, an apparatus or system 200 usable with the method 100 is illustrated. The apparatus 200 includes one or more Web site servers or controllers 202, 204 that may communicate directly or indirectly with one or more user devices 206, 208, 210 or one or more database servers 212 via a computer, data, or communications network 214. For purposes of further explanation and elaboration of the method 100, the method 100 will be assumed to be operating on the Web site server 202.

The server 202 preferably performs the steps 102, 104 and 106 of the method 100 and receives information, search terms or keywords, etc. from users who may be using the user devices 206, 208, 210. The server 202 may implement or host one or more Web sites that users can access via the communications network 214. For example, the server 202 maybe the server implementing or hosting the Web site found at www.iwon.com. A server can comprise a single device or computer, a networked set or group of devices or computers, a workstation, etc. In some embodiments, a Web site server also may function as a database server and/or as a user device. The use, configuration and operation of user devices will be discussed in more detail below.

The user devices 206, 208, 210 preferably allow users to interact with the server 202 and the remainder of the apparatus 200. The user devices 206, 208, 210 also may enable a user to access Web sites hosted or operated by the servers 202 and 204. If desired, the user devices 206, 208, 210 also may be connected to or otherwise in communication with other devices. Possible user devices include a personal computer, portable computer, mobile or fixed user station, workstation, network terminal or server, cellular telephone, kiosk, dumb terminal, personal digital assistant, etc. The use, configuration and operation of user devices will be discussed in more detail below.

The database server 212 may host databases or other information used by a server implementing the method 100. For example, the database server 212 may host information that may be used in providing search results to a visitor to a Web site conducting a search. The database server may provide search results to the Web site in response to queries from the Web site generated from search terms provided by the visitor. The use and operation of the database server 212 will be discussed in more detail below.

Many different types of implementations or hardware configurations can be used in the system 200 and with the method 100 and the method 100 is not limited to any specific hardware configuration for the system 200 or any of its components.

The communications network 214 might be or include the Internet, the World Wide Web, or some other public or private computer, cable, telephone or communications network or intranet, as will be described in further detail below. The communications network 214 illustrated in FIG. 2 is only meant to be generally representative of cable, computer, telephone or other communication networks for purposes of elaboration and explanation of the present invention and other devices, networks, etc. may be connected to the communications network 214 without departing from the scope of the present invention. The communications network 214 can also include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a Web site server without departing from the scope of the present invention.

Now referring again to FIG. 1, the method 100 and the steps 102, 104 and 106 will be discussed in more detail in relation to the system 200 illustrated in FIG. 2. As previously discussed above, the method 100 includes a step 102 during which a Web site server, such as the server 202, receives one or more search terms directly or indirectly from a visitor. For example, the server 202 may receive a search term from a visitor accessing a Web site hosted by the server 202. The visitor may be accessing the Web site with the user device 208, which may be a personal computer connected to or accessing the Web. As a second example, the server 202 may receive a search term from a different server, such as the Web site server 204, that the visitor is accessing. Thus, the visitor may be unaware of the involvement of the server 202 in the search processing being conducted by the server 202 in regards to the search terms entered by the visitor. In some embodiments, the "visitor" may actually be a computer or other automated system that generates the search term(s) and provides them to the server 202. Thus, the term "visitor" should not be limited to a human creating the search term(s) that may be received during the step 102.

Figure 3:
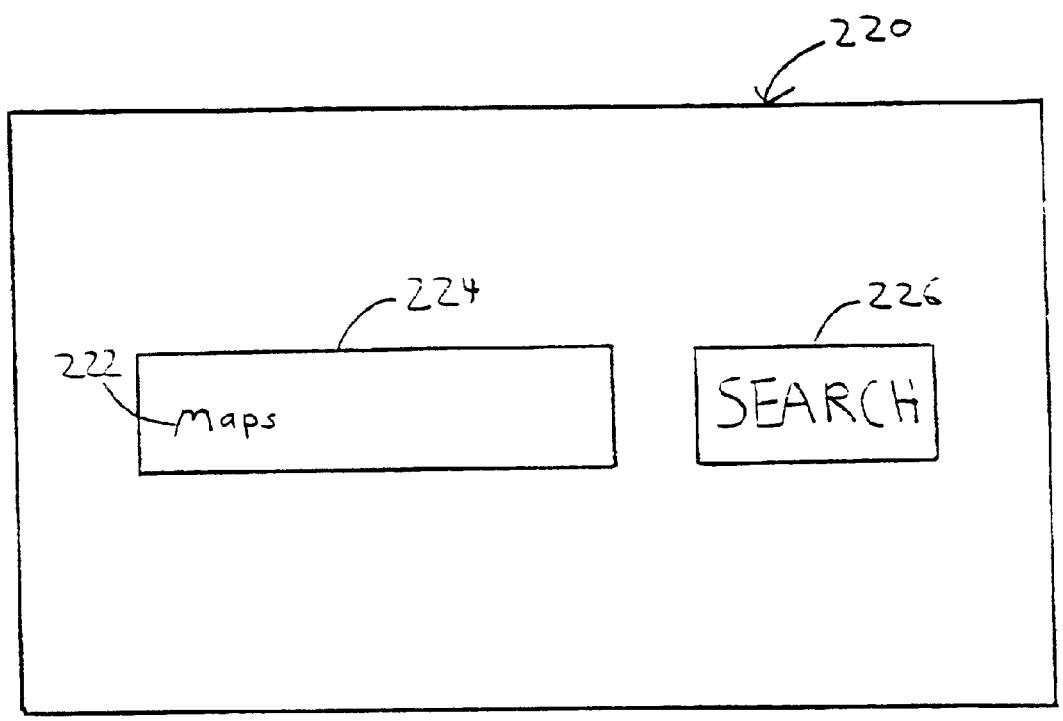
FIG. 3 is an illustration of a Web page and search term for a visitor accessing one of the Web site servers of FIG. 2.

An example of a visitor to a Web site page 220 entering a search term "maps" 222 in a search field 224 for a search engine is illustrated in FIG. 3. The visitor may initiate the search on the term "maps" by entering or typing the term "maps" in the search field 224 and clicking on or selecting "search" button 226. The server hosting the Web page 220 receives the term "maps" as a search term during the step 102.

During the step 104, the Web site server 202 determines or otherwise selects a navigation path for the visitor that is based, at least in part, on the search term(s) received directly or indirectly from the visitor during the step 102. For example, the server 202 may select a navigation path that may send the visitor to a new Web site, a different Web page on the Web site that the visitor is currently accessing or on which the visitor entered or provided search terms, etc. As another example, during the step 104, the server 202 may decide to provide a special Web page, jump page, skip page splash page, window, etc. to the visitor that may not be provided to the visitor when different search terms are received during the step 102.

The determination made during the step 104 also may be based in part on other factors in addition to the search terms received from a visitor during the step 102. In some embodiments, if the server 202 knows or has access to any information about the visitor, such as the visitor's age, gender, income, occupation, state of residence, personal preferences, shopping history, bank account balance, credit limit or history, homeowner status, marital status, etc., the server 202 may use such information in determining a navigation path for a visitor. For example, the server 202 may provide different jump pages to different visitors depending on the age of the visitor, each of the jump pages being targeted to or associated with a different age range. The server 202 might use a jump page only when certain search terms are received during the step 102. Thus, the selection of the jump page to serve or otherwise provide to the visitor is based both on the visitor's age and the visitor's search terms.

Visitor information may be stored in a visitor database, which may be stored, updated, populated, maintained and/or accessed by the server 202, the database server 212, or some other device. Visitor information may be collected from a visitor as the visitor visits a Web site and supplies information, third party information collection agencies, direct marketing groups or mailing lists, publicly available records, etc.

In other embodiments, the server 202 may determine or offer different navigation paths for different visitors based, at least in part, on external events, such as the occurrence of a holiday, a designated rise or fall in the Dow Jones Industrial Average, the day of the week, a sale at a particular merchant, the season of year, the time of day a visitor provides search terms, the number of visitors currently conducting searches, the use or nonuse by visitors of navigation path options provided to visitors in the past, weather conditions, etc. For example, the server 202 may provide different links on the same or different jump pages depending on the day of the week. For a visitor interested in golf and conducting a search on a Sunday and using "golf" as a search term, the server 202 might provide the visitor with a jump page of links to merchants that sell golf equipment. If the visitor conducts the search on Wednesday and uses "golf" as a search term, the server 202 might provide the visitor with a different jump page of links to golf courses in the visitor's local area that have available tee times for the following weekend. Therefore, the selection of the jump page to supply or serve the visitor is based both on the visitor's search terms and on the day of the week the visitor is conducting the search.

As a more specific illustration of how the server 202 may determine or otherwise select a navigation path during the step 104 based, at least in part, on one or more search terms received during the step 102, the server 202 may have several options depending on the use of the search term "maps." For example, upon receiving the search term "maps" during the step 102, the server 202 may determine that the visitor is most likely looking information on maps, where to purchase maps, map history, etc. Thus, the server 202 may dynamically build a Web page and serve it to the visitor that contains a list of Web sites or URLs on such topics. Thus, the visitor is directed to a search results page, the contents of which are dynamically generated based on the term "maps". Alternatively, the server 202 may determine that the visitor is most likely looking for a map of a specific continent, country, state, province, geographic region, etc. and direct the visitor to a Web page on the same or a different Web site that will allow the visitor to provide information (e.g., continent name, country name, state name, etc.) regarding the map the visitor is looking for. If the server 202 can ascertain what continent, country, state, etc. the visitor is from or otherwise looking for, the server 202 may automatically direct the visitor to a Web page that will display the map of such continent, country, state, etc.

In the case where the server 202 receives the single search term "maps" during the step 102, the server 202 may decide that either of the two previously described options are possible. Thus, the server 202 may direct the visitor to a jump page that requests that the visitor indicate whether the visitor is looking for information about maps or for a specific map. Thus, the navigation path of the visitor is directed to the new jump page. Depending on how the server 202 interprets the search term "maps", the visitor may be directed to, or served, different Web pages, jump pages, Web sites, etc. Thus, the server 202 automatically may vary the navigation path of the visitor depending on the determination made during the step 104.

Three more complex examples of how the server 202 may vary the navigation path of a visitor conducting a search at a Web site will now be described. In all threeexamples, different search terms may be associated with different point values. When search terms are received during the step 102, the point values for the search terms may be totaled or used in a function or formula to determine a score or rank for the search terms. The score or rank may then be used to ascertain how the server 202 may direct the visitor to other Web sites, Web pages, jump pages, etc.

In the first complex example, certain search terms related directly or indirectly to the Walt Disney Corporation may be assigned point values, as illustrated in table 300 in FIG. 4. As shown in the table 300, the terms "orlando," "florida," "hotel," "ticket" and "ride" are each given a score of minus three (−3) points, the terms "cartoon," "film," "animation," "character" and "movie" are each given a score of plus three (+3 points), and the terms "mickey mouse," "disney," "fun," "entertainment" and "studio" are each given a score of zero (0) points. All search terms received during the step 102 that are not in the table 300 maybe assumed to have a value of zero (0) points.

The table 300 can be used to determine when a visitor using a search engine on a web site may be looking for information about visiting Walt Disney World in Florida, information about Walt Disney cartoon characters, or neither or both of the foregoing, when the visitor enters one or more of the search terms from the table 300 and to direct the visitor accordingly.

A positive total score of the values of the search terms entered by the visitor implies that the visitor is looking for information about Walt Disney Cartoon characters. A negative total score of the values of the search terms entered by the visitor implies that the visitor is looking for information about visiting Walt Disney World in Florida. A zero total score of the values of the search terms implies that the visitor may be interested in both or neither of the foregoing.

In some embodiments one or more rules may be established to govern when and how the table 300 might be used by the server 202. For example, a rule maybe used that provides that search terms received during the step 102 must include at least two terms in the table 300 before the table 30 will be used during the step 104. In addition, the rule might require that at least one of the search terms received during the step 102 is in the table 300 and has a non-zero point value associated with it. Thus, according to this rule, the search results received during the step 102 would have to include at least one of the terms "orlando," "florida," "hotel," "ticket," "ride," "cartoon," "film," "animation," "character" and "movie" before the server 202 can use the table 300 during the step 104. If the server 202 does not use the table 300 during the step 104 to pick one of a plurality of navigation paths for a visitor, the server 202 may simply provide search results to the user using any conventional search engine technique.

In this example, if the visitor enters the search term "mickey mouse," the server 202 may associate a score of zero with the search since the term "mickey mouse" has an assigned value of zero points. Similarly, if the visitor enters the search terms "mickey mouse" and "disney," the server 202 may associate a score of zero with the search since the terms "mickey mouse" and "disney" both have a total value of zero points. Thus, during the step 104, the server 202 may not be able to determine whether the visitor is looking for information about visiting Walt Disney World in Florida or information about Walt Disney cartoon characters. Therefore, the server 202 may provide search results that contain the search terms or are associated with the search terms on a search results Web page provided or served to the visitor. Alternatively, the server 202 may provide or serve a jump page to the visitor that asks whether or not the visitor is interested in information about visiting Walt Disney World in Florida, information about Walt Disney cartoon characters, or neither, and allow the visitor to make a selection. Thus, the server 202 has allowed the visitor to refine the search. Depending on the visitor's selection, the server 202 may direct the visitor to a Web site or web page devoted to Walt Disney travel information, Walt Disney cartoon characters, or generic search results.

If the visitor enters the search terms "disney" and "animation," the server 202 can determine a total score of plus three (+3) during the step 104. Thus, the server 202 can assume that the visitor is interested in information about Walt Disney characters. The server 202 may then provide filtered or specific search results limited to Walt Disney characters. Alternatively, the server 202 may automatically direct the visitor to a Web site or web page specializing in or having information about Walt Disney characters. As a further alternative, the server 202 may serve or provide the visitor a jump page asking the visitor to provide further information about what specific Walt Disney character the visitor is interested in. In each of these cases, the navigation of the visitor though the Web is changed as a result of different options that are or are not available depending on the visitor's search terms.

If the visitor enters the search terms "disney" and "studio," and "florida," the server 202 can determine a total score of minus three (−3) during the step 104. Thus, the server 202 can assume that the visitor is interested in information visiting or traveling to Walt Disney World in Florida. The server 202 may then provide filtered or specific search results limited to Walt Disney World travel information. Alternatively, the server 202 may direct the visitor automatically to a Web site or web page specializing in or having information about traveling to Walt Disney World. As a further alternative, the server 202 may serve or provide the visitor automatically with a jump page asking the visitor to provide further information about what specific Walt Disney rides, accommodations, travel dates, etc. the visitor is interested in. In each of these cases, the navigation of the visitor though the Web is changed and directed by the server 202 as a result of the visitor's search terms.

If the visitor does not use any of the search terms in the table 300, the server 202 may provide search results or visitor navigation options according to its standard searching procedures and algorithms. Thus, as illustrated by the previous example, the method 100 provides a way of enhancing search results when one or more specific search terms or keywords are received during the step 102. The method 100 may then be used in conjunction with other searching procedures and algorithms.

Figure 5:
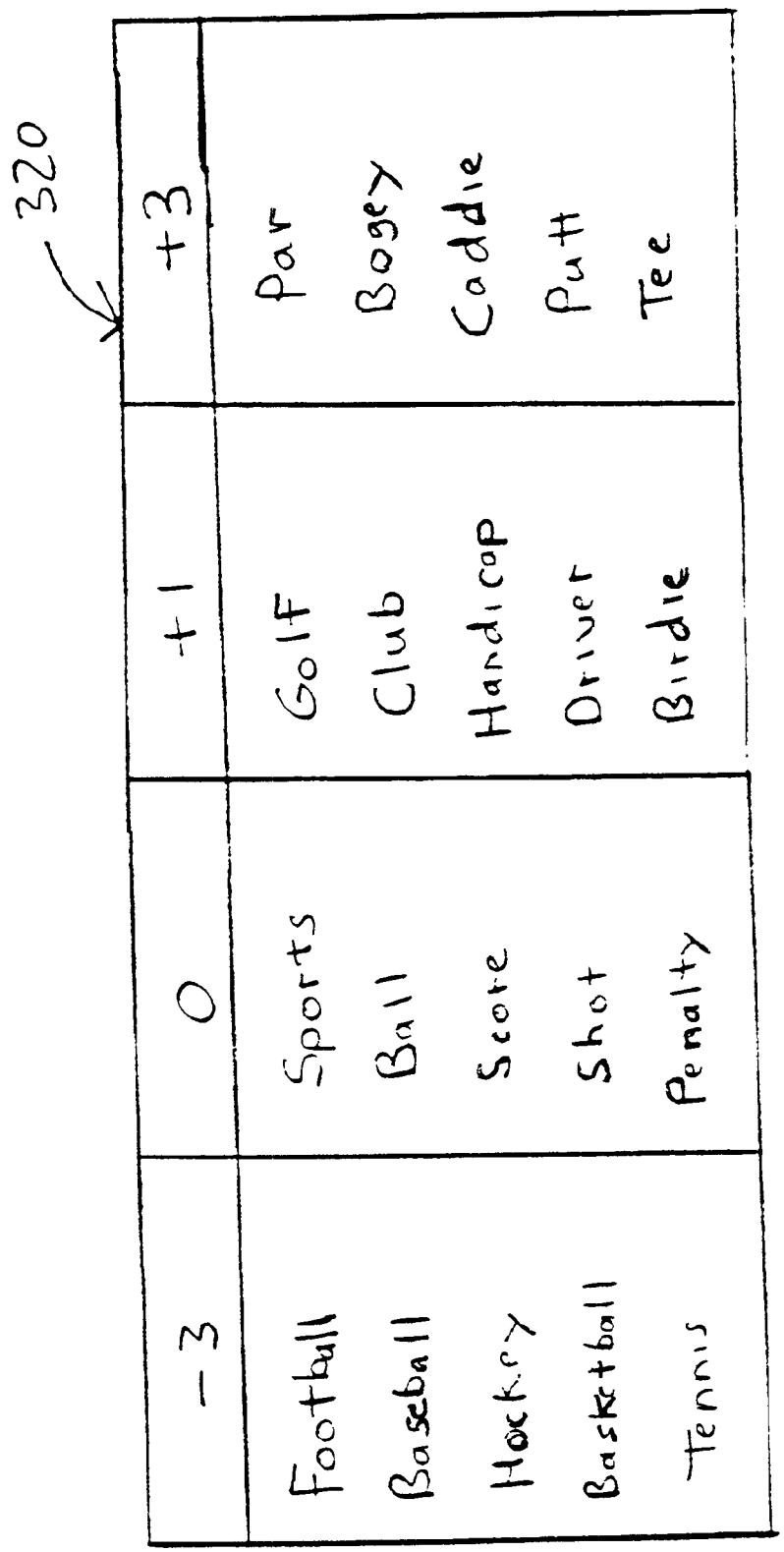
FIG. 5 is a second illustration of a database or table of search terms that may be used during the determine navigation path step of the flowchart of FIG. 1.

In the second complex example, certain search terms related directly or indirectly to sporting related topics may be assigned point values, as illustrated in table 320 in FIG. 5. The use of table 320 is illustrative of how the server 202 may want to direct a visitor searching for specific information on the sport of golf automatically to a specific Web site or Web page while automatically directing visitors searching for other sports related information to other Web sites or Web pages. As illustrated in the table 320, each of the search terms "football," "baseball," "hockey," "basketball" and "tennis" are assigned a point value of minus three (−3), the search terms "golf," "club," "handicap," "driver" and "birdie" are each assigned a point value of plus one (+1), and the search terms "par," "bogey," "caddie," "putt" and "tee" are each assigned a point value of plus three (+3).

The server 202 may use the table 320 in a variety of ways or in accordance with a variety of rules when conducting searches. For example, in some embodiments, a rule may be implemented that determines that the server 202 may use the table 320 during the step 104 only if at least one the search terms in the table 320 having a non-zero score associated with it is received during the step 102. In other embodiments, a different rule may be implemented that determines that the server 202 may use the table 320 only when at least two search terms in the table are used, one of which must have a non-zero score. By requiring these two conditions, the server 202 can determine more accurately if the visitor is interested in sports when terms that may be used in a variety of contexts, such as "shot," "penalty" or "ball," are received during the step 102.

A total point value determined during the step 104 for search terms received during the step 102 that exceeds plus three (+3) may imply that a visitor supplying those search terms is likely interested in talking about or learning more about golf. As a result of such a score, the server 202 may then direct the visitor automatically to a Web site that deals primarily with golf related topics.

A total point value determined during the step 104 for search terms received during the step 102 that exceeds plus ten (+10) may imply even more strongly that the visitor is interested in talking about or learning about golf. As a result of such a score, the server 202 may then direct the visitor to a chat room or bulletin board about specializing or dealing primarily with golf related topics. Alternatively, or in conjunction, the server 202 may direct the visitor automatically to a jump page containing a list of links that the visitor may select, each of will lead the visitor to very specific content or material relating to golf and the search terms provided by the visitor. In this example, the server 202 does not provide or show the jump page with the links to the visitor unless the visitor's search terms result in a score higher than plus ten (+10). Thus, even though the visitor can decide which, if any, of the links to select or follow on the jump page, the server 202 has influenced and directed the navigation path of the visitor and rewarded the visitor for providing very specific search terms.

A total point value determined during the step 104 for search terms received during the step 102 that is less than plus one (+1) and uses at least one term in the table 320 implies that the visitor is interested in sports, but not necessarily golf. Thus, the server 202 may direct the visitor automatically to a jump page or a Web page specializing in searching of sports of information that requests the visitor to select from a variety of listed sports, thereby allowing the server 202 to ascertain the interest of the visitor more clearly.

The table 320 illustrates that different search terms may be assigned different point values, even though all of the search terms with are related to sports. The search terms having a point value of plus one (+1) imply that a visitor supplying those search terms is interested in golf. However, since these terms might also be used with other sports, their use is not a clear indication of a visitor's interest in the sport of golf as the search terms having a point value of plus three (+3). For example, a term such as "handicap" may be used in golf as well as in bowling and horse racing.

The third complex example illustrates how a search engine or a Web site may avoid serving information or search results that are considered obscene or pornographic, direct visitors searching for such information to a second Web site, and/or require visitors to confirm that they wish to receive filtered search results or unfiltered search results. In a similar manner to allocation of terms in the table 300 of FIG. 4 and table 320 of FIG. 5, terms may be allocated in a variety of categories, each category having an associated point value, as illustrated in table 350 of FIG. 6.

Again, a rule may be established to determine when to use the table 350 during the step 104. For example, in one embodiment, the table 350 maybe used during the step 104 whenever one of the search terms listed in the table 350 is received during the step 102. In other embodiments, two search terms from the table 350 may be required to be received during the step 102 before the table is used during the step 104. If the table 350 is not used during the step 104, the server 202 may provide standard search results to the visitor without the possibility of automatically varying the navigation path of the visitor or selecting from a plurality of navigation paths to direct the visitor to automatically.

Any time one or more of the terms in the table 350 are received during the step 102 from a visitor accessing a Web site hosted by the server 202, the server 202 may determine a total score for the search terms by totaling the point values associated with the different search terms. Such determination may occur by the server 202 during the step 104. All search terms received during the step 102 that are not in the table 350 may be assumed to have a value of zero (0) points. In this example, a score of plus ten (+10) or more may indicate that the visitor supplying the search terms is looking for pornographic materials, a score between zero (0) to plus nine (+9) may indicate that the visitor is looking for adult oriented materials, which may or may not be pornographic, a score between minus ninety-nine (−99) and zero (0) may indicate that the visitor is looking for medical or health related information, and a score of less than minus one-hundred (−100) may indicate that visitor is searching for materials the Web site considers illegal or that the Web site will not provide information about.

When the server 202 determines a score of plus ten (+10) or more, the server 202 may direct the visitor immediately and automatically to a different Web site (perhaps a Web site hosted by the Web site server 204). Alternatively, the server 202 may serve or display a jump page to the visitor that indicates that the visitor's search terms may led the visitor to potentially pornographic material. The jump page also may ask the visitor to indicate consent to seeing or otherwise receiving unfiltered results of the search prior to directing the visitor to the different Web site. In addition, the jump page also may allow the visitor to elect to receive only filtered search results. The filtered search results being provided by the server 202 directly on a Web page hosted or served by the server 202.

When the server 202 determines a score of between zero (0) and plus nine (+9), the server 202 may direct the visitor immediately and automatically to a Web page on the same Web site that contains search results provided by the server 202. The search results may be the same as the filtered search results described above. Thus, the jump page used when the score is plus ten (+10) or more is not used and the visitor's navigation path is different than in the previous case.

When the server 202 determines a score of between minus ninety-nine (−99) and zero (0), the server 202 may direct the visitor immediately and automatically to a Web page on the same Web site that contains search results provided by the server 202. Since a score in this range may indicate that the visitor is interested in medical information, the Web page served to the visitor may contain links to other Web pages on the Web site, or to other Web sites, that the visitor can select. Such links may not be provided when the score is between zero (0) and plus nine (+9) since the latter case does not imply that the visitor is interested in medical information. Again, the jump page used when the score is plus ten (+10) or more is not used and the visitor's navigation path is different. Moreover, navigation path options provided to the visitor also may be different.

When the server 202 determines a score of minus one-hundred (−100) or less, the server 202 may imply that the searcher is looking for illegal material (e.g., child pornography) or materials that the server 202 will not provide to the visitor. In such a case, the server 202 may provide a jump page to the visitor that indicates that the server 202 will not provide search results to the visitor based on such search terms. Alternatively, the server 202 may direct the visitor immediately and automatically to a Web page that contains the unfiltered results previously described above or to another Web site.

In each of the first, second and third complex examples described above, scoring by the server 202 during the step 104 of search terms provided by the visitor and received during the step 102 allows the server 202 to direct the visitor to different search results, Web pages, Web sites, etc. based on the total score associated with the search terms. Thus, the server 202 can not only alter search results provided to the visitor based on the scoring, but can also alter or direct the navigation of the visitor through the Web based on the scoring. While the tables 300, 320 and 350 used a limited number of search terms and categories for purposes of explanation and illustration of the method 100, such tables can obviously have many different categories, search terms and point values. In addition, each category does not need to have the same number of search terms.

Search terms and their associated values may be stored in one or more databases or lists that are populated, maintained, updated, accessed, hosted and/or used by the server 202 or another device, such as the database server 212. Such a database or list may be provided, updated, maintained, etc. by a third party and accessed whenever a search is conducted by or with the server 202.

A database or list may be updated or changed over time, such as when likely desired search results for specific combinations of search terms become known or available, either based on a visitor's perspective (e.g., what action will a visitor to a Web site be willing to take for the search tern(s) provided by the visitor) or a Web site's perspective (e.g., what action does the Web site want to take for various combinations of search terms provided by visitors). The database or list may be supplied by a third party to allow a Web site operator to direct visitors to a Web site hosted by or for the third party. The third party may provide compensation the Web site operator for directing visitors to the third party's web site. The compensation may be based, at least in part, on the scores generated from keywords entered by the visitors, the specific search terms used, the occurrence of an external event, information known about one or more visitors to the Web site, etc.

During the step 106, the server 202 will direct a visitor's navigation over the Web or a Web site as determined during the step 104. As previously discussed above, the server 202 may direct the visitor to a different Web site or Web page than the Web site or Web page on which the visitor provided search terms or conducted a search. The server 202 may direct the visitor to jump page or window selected or formatted by the server 202 as a result of the search terms provided by the visitor and received by the server during the step 102. In other embodiments, the server 202 may place one or more different links on a Web page of search results provided to a visitor conducting a search depending on the search terms received by the server during the step 102. Thus, the visitor's navigation options vary depending on the search terms provided by the visitor. Moreover, the server 202 can automatically and immediately direct or implement the navigation path of the visitor based on search terms provided by the visitor. Different visitors may not even realize that different navigational path outcomes may occur or be implemented by the server as a result of variations in search terms provided by the visitors.

As illustrated by the examples and discussion provided above, the method 100 allows a Web site server to automatically and/or immediately direct a visitor navigating through the Web. Such automatic and immediate direction of a visitor's navigation may include the Web server automatically and immediately serving a jump page to visitor, directing the visitor to a new or different Web site, directing the visitor to a new or different page, etc. such that the visitor is directed automatically to one of a plurality of designated locations on Web based on the visitor's search terms. Different search terms supplied by different visitors may result in different visitors automatically being directed to different locations on the Web. Similarly, different scoring, ranking or categorizing of search terms supplied by different visitors may result in different visitors automatically being directed to different locations on the Web.

While the examples disclosed herein have shown scoring based on point values associated with different search terms, other methods and techniques may also be used to associate different Web navigation paths with different search terms or different combinations of search terms. For example, a visitor providing a search term that is received during the step 102 and is the name of a city, state, country, or other geographic region may be served or directed automatically with a jump page having a map of that city, state, country, or other geographic region. As another example, a visitor providing a search term that is received during the step 102 and is a kind of a animal may be directed automatically to a Web site that has a camera pointing to the kind of animal. Different Web sites might be used for different animal search terms. As a third example, a visitor providing a search term that is received during the step 102 and is the name of a professional sports team maybe directed automatically to a Web site devoted to information about the sports team. As a forth example, a visitor providing a search term that is received during the step 102 and is the name of company may be directed automatically to a Web page devoted to the company on a Web site devoted to business and financial information. Different Web pages on the same Web site may be used for different company search terms.

All four of the previous examples may be operating simultaneously. If a search term from a Web site visitor is received by the server 202 during the step 102, and the search term is not a name of a geographic region, professional sports team, animal or company, the server 202 may provide standard search results and not automatically direct the Web navigation path of the visitor.

Figure 7:
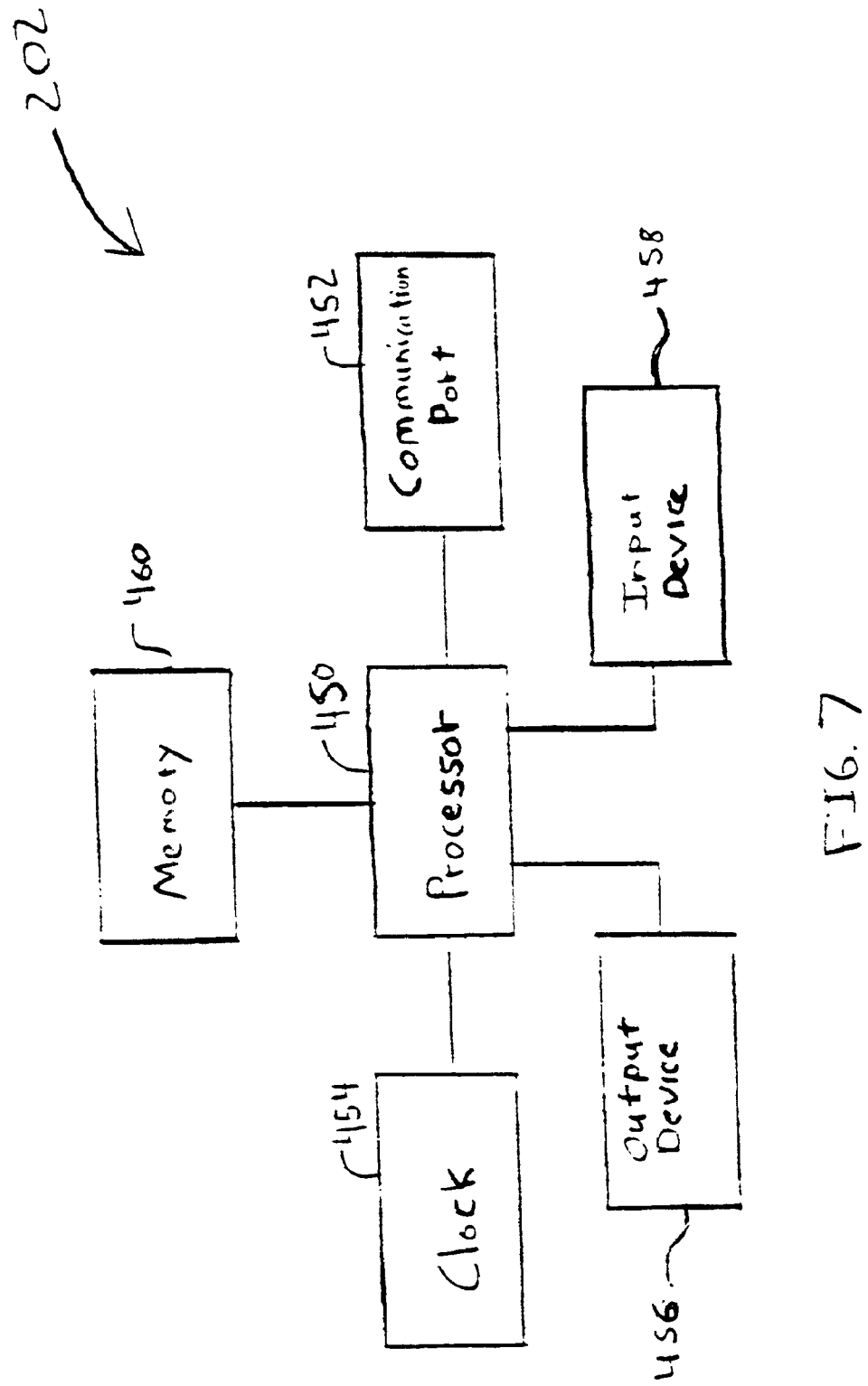
FIG. 7 is a block diagram illustrating a representative Web site server of FIG. 2.

Now referring to FIG. 7, a representative block diagram of a Web site server, such as the server 202, is illustrated. The server 202 may include a processor, microchip, central processing unit, or computer 400 that is in communication with or otherwise uses or includes one or more communication ports 452 for communicating with user devices and/or other devices. Communication ports may include such things as local area network adapters, wireless communication devices, etc. The server 202 also may include an internal clock element 454 to maintain an accurate time and date for the server 202, create time stamps for search results received by or at the server 202, etc.

If desired, the server 202 may include one or more output devices 456 such as a printer, is infrared or other transmitter, antenna, audio speaker, display screen or monitor, text to speech converter, etc., as well as one or more input devices 458 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 202 may include a memory or data storage device 460 to store information, software, databases, search terms, search term points lists, device drivers, navigation path options, etc. The memory or data storage device 460 preferably comprises an appropriate combination of magnetic, optical and/or semiconductor memory, and may include, for example, Random Access Memory (RAM), Read-Only Memory (ROM), a tape drive, flash memory, a floppy disk drive, a ZIP™ disk drive, a compact disc and/or a hard disk.

The processor 450 and the data storage device 460 in the server 202 may each be, for example: (i) located entirely within a single computer or other computing device; or (ii) connected to each other by a remote communication medium, such as a serial port cable, telephone line or radio frequency transceiver. In one embodiment, the server 202 may comprise one or more computers that are connected to a remote server computer for maintaining databases.

A conventional personal computer or workstation with sufficient memory and processing capability may be used as the server 202. In one embodiment, the server 202 operates as or includes a Web server for an Internet environment. The server 202 preferably is capable of high volume transaction processing, performing a significant number of mathematical calculations in processing communications and database searches. A Pentium™ microprocessor such as the Pentium™ microprocessor, manufactured by Intel Corporation may be used for the processor 450. Equivalent processors are available from Motorola, Inc., AMD, or Sun Microsystems, Inc. The processor 450 also may comprise one or more microprocessors, computers, computer systems, etc.

Software may be resident and operating or operational on the server 202. The software may be stored on the data storage device 460 and may include a control program for operating the server, databases, etc. The control program may control the processor 450. The processor 450 preferably performs instructions of the control program, and thereby operates in accordance with the present invention, and particularly in accordance with the methods described in detail herein. The control program may be stored in a compressed, uncompiled and/or encrypted format. The control program furthermore includes program elements that may be necessary, such as an operating system, a database management system and device drivers for allowing the processor 450 to interface with peripheral devices, databases, etc. Appropriate program elements are known to those skilled in the art, and need not be described in detail herein. According to an embodiment of the present invention, the instructions of the control program may be read into a main memory from another computer-readable medium, such as from a ROM to RAM. Execution of sequences of the instructions in the control program causes the processor 450 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

Figure 8:
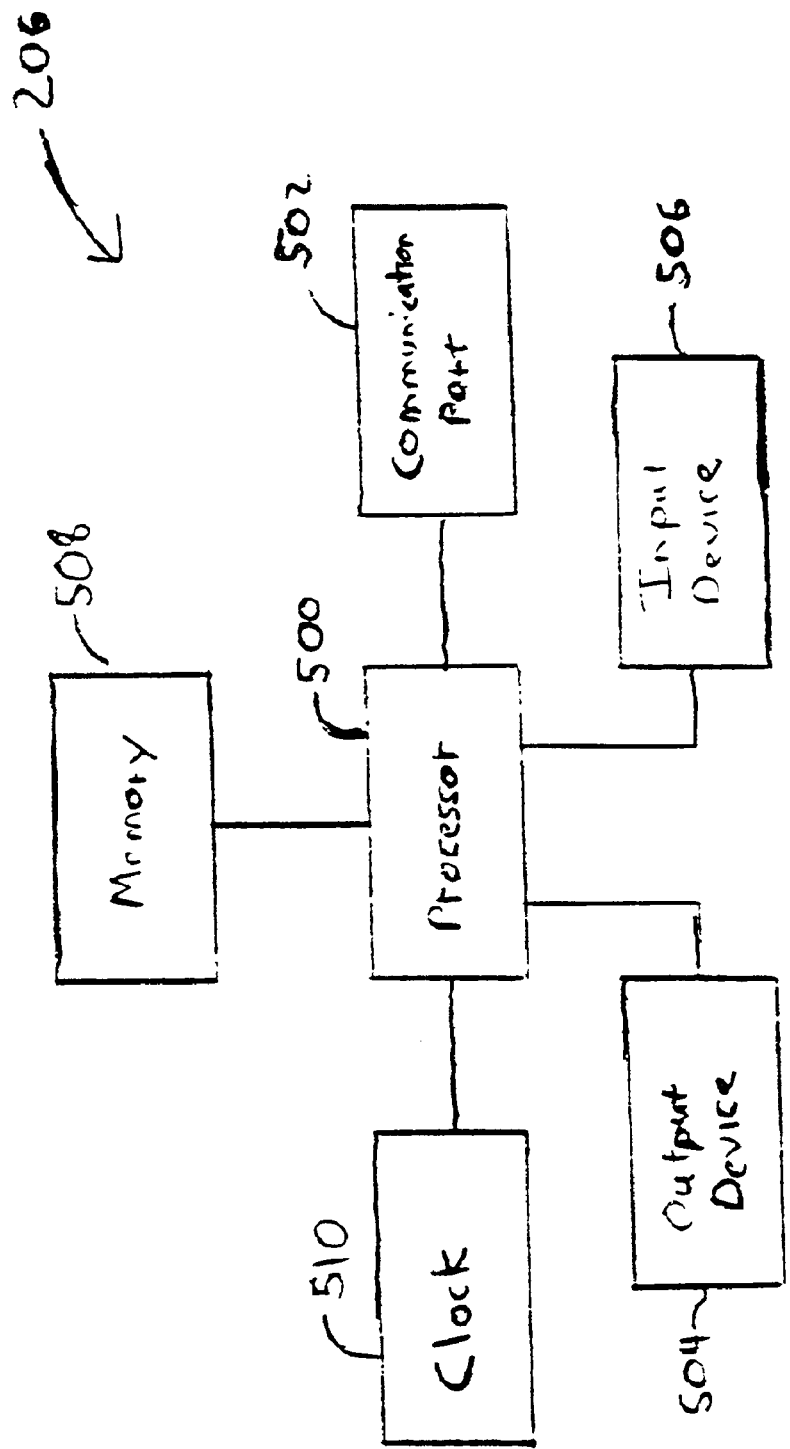
FIG. 8 is a block diagram illustrating a representative user device of FIG. 2.

Now referring to FIG. 8, a representative block diagram of a user device, such as the user device 206, is illustrated.

The user device 206 may include a processor, microchip, or computer 500 that is in communication with or otherwise uses or includes one or more communication ports 502 for communicating with Web site servers, database servers, etc. For example, the user device 206 may have an infrared or other transmitter as one communication port to allow the user device 206 to communicate with the server 202. In addition, if the user device 206 is connected to the server 202 via an Ethernet local area network, the user device 206 may include an Ethernet adapter as a communication port to allow the user device 206 to communicate with the server 202.

The user device 206 may include one or more output devices 504 for conveying information, such as a printer, audio speaker, infrared or other transmitter, antenna, display screen or monitor, text to speech converter, etc. The user device 206 also may include one or more input devices 506 for receiving information, such as a bar code reader or other optical scanner, infrared or other receiver, antenna, magnetic stripe reader, image scanner, roller ball, touch pad, joystick, touch screen, microphone, computer keyboard, computer mouse, etc. A user device 206 may include a voice recognition system or interactive voice response unit as an input device 506 to aid in receiving and processing search requests or search terms. The user device 206 also may include a fingerprint scanner or reader, a retinal scanner, a voice analyzer, or other biometrics data input device as an input device 506 to allow the user device 206 to identify users of the user device 206.

In addition to the above, the user device 206 may include a memory or data storage device 508 to store information, software, databases, device drivers, user information, search terms, browsers, computer software, operating systems, etc. The memory or data storage device 508 preferably comprises an appropriate combination of magnetic, optical and/ or semiconductor memory, and may include, for example, Random Access Memory (RAM), Read-Only Memory (ROM), a tape drive, flash memory, a floppy disk drive, a ZIP™ disk drive, a compact disc and/or a hard disk.

The user device 206 also may include an internal clock element 510 to maintain an accurate time and date for the user device 206, create time stamps for information, search requests, etc. generated or received via the user device 206.

As previously discussed above, possible user devices include a personal computer, portable computer, mobile or fixed user station, workstation, network terminal or server, telephone, beeper, kiosk, dumb terminal, personal digital assistant, facsimile machine, etc. If desired, the user device 206 also may function as the server 202.

The database server 212 may have the same configuration as either the Web site server 202 or the user device 206. Therefore, further discussion of the components of the database server is not necessary.

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow. Further, even though only certain embodiments have been described in detail, those having ordinary skill in the art will certainly understand that many modifications are possible without departing from the teachings thereof. All such modifications are intended to be encompassed within the following claims.

The present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

While specific implementations and hardware configurations for Web site servers and user devices have been illustrated, it should be noted that other implementations and hardware configurations are possible and that no specific implementation or hardware configuration is needed. Therefore, many different types of implementations or hardware configurations can be used in the system 200 and the methods disclosed herein are not limited to any specific hardware configuration.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, ZIP™ disk, flash or optical memory card, microprocessor, solid state memory device, RAM, EPROM, or ROM.

The terms "computer-readable medium," "computer program," "computer software," "software" and "program" as used herein refers to any medium that directly or indirectly participates in providing instructions to a processor for execution. Such a medium may take many forms, including but not limited to, non-volatile media, volatile media, and transmission media. Nonvolatile media include, for example, optical or magnetic disks. Volatile media include dynamic random access memory (DRAM), which typically constitutes the main memory. Transmission media include coaxial cables, copper wire and fiber optics, including the wires that comprise a system bus coupled to a processor. Transmission media can also take the form of acoustic, electrical or electromagnetic waves, such as those generated during radio frequency (RF) and infrared (IR) data communications.

The connections or communications between user devices, Web site servers, and database servers discussed herein is only meant to be generally representative of cable, computer, telephone, or other communication or data networks and methods for purposes of elaboration and explanation of the present. The connections are also intended to be representative of, and include all or a part of, the Internet, the World Wide Web, and other privately or publicly operated networks, including wide area networks, local area networks, data communication networks or connections, intranets, routers, satellite links or networks, microwave links or networks, cellular telephone or radio links, fiber optic transmission lines, ISDN lines, T1 lines, etc. In addition, as used herein, the terms "computer," "user device," "terminal," "client," "device" and "client device" are generally interchangeable and are meant to be construed broadly and to include, but not be limited to, all clients, client devices or machines, personal digital assistants and palm top computers, cash registers, terminals, computers, point-of-sale devices, processors, servers, etc. connected or connectable to a computer or data communications network and all devices on which Internet-enabled software, such as the NETSCAPE COMMUNICATOR™ or NAVIGATOR™ browsers, MOSIAC™ browser, or MICROSOFT INTERNET EXPLORER™ browsers, can operate or be run. The term "browser" should also be interpreted as including Internet-enabled software and computer or client software that enables or allows communication over a computer network and Internet-enabled or World Wide Web enabled, monitored, or controlled devices such as WebTV™ devices, household appliances, phones, etc.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method for directing navigation of a visitor to a World Wide Web site, comprising:
   receiving at least one search term from a visitor to a World Wide Web site;
   associating each of a plurality of navigation paths with a respective one of a plurality of score ranges;
   determining a score for said at least one search term;
   selecting a navigation path based, at least in part, on said at least one search term, wherein said navigation path is selected from said plurality of navigation paths and said score of said at least one search term is within a scored range associated with said navigation path; and
   directing said visitor along said navigation path automatically.

2. The method of claim 1, wherein said selecting a navigation path comprises:
   scoring said at least one search term.

3. The method of claim 1, further comprising:
   associating a point value with each of a set of potential search terms.

4. The method of claim 3, wherein said selecting a navigation path comprises:
   determining a score based at least in part on point values associated with said at least one search term.

5. The method of claim 4, wherein said score is also based at least in part on demographic information associated with said visitor.

6. The method of claim 4, wherein said score is also based at least in part on an occurrence of an external event.

7. The method of claim 4, wherein said selecting a navigation path comprises:
   determining said navigation path based, at least in part, an said score.

8. The method of claim 1, further comprising:
   establishing a rule under which said navigation path can be selected from one of said plurality of potential navigation paths.

9. The method of claim 1, further comprising:
   establishing a rule which said navigation path can be determined.

10. The method of claim 1, further comprising:
    receiving compensation for directing said visitor to a specific World Wide Web site based on said at least one search term.

11. The method of claim 1, further comprising:
    determining demographic information about said visitor.

12. The method of claim 1, wherein said directing said visitor along said navigation path includes at least one of the following:
    automatically serving a jump page to said visitor;
    automatically opening a window for said visitor;
    automatically directing said visitor to a new World Wide Web site; and
    automatically directing said visitor to a new Web page of said World Wide Web site.

13. The method of claim 1, wherein said directing said visitor along said navigation path includes serving a jump page to said visitor, said jump page including at least one of the following:
    a link to a new World Wide Web site;
    a link to a Web page on said World Wide Web site;
    a link to filtered search results; and
    a link to unfiltered search results.

14. The method of claim 1, further comprising:
    establishing a rule that must be satisfied before said visitor can be directed along said navigation path; and
    determining if said at least one search term satisfies said rule.

15. The method of claim 1, further comprising:
    associating each of said plurality of navigation paths to at least one of a plurality of combinations of search terms, wherein said navigation path is selected only if said at least one search term includes a combination of search terms associated with said navigation path.

16. A system for directing navigation of a visitor to a World Web Web site, comprising:
    a memory;
    a communication port;
    a processor connected to said memory and said communication port, said processor being operative to:
       receive at least one search term from a visitor to a World Wide Web site;
       associate each of a plurality of navigation paths with a respective one of a plurality of score ranges;
       determine a score for said at least one search term;
       select a navigation path based, at least in part, on said at least one search term, wherein said navigation path is selected from said plurality of navigation paths and said score of said at least one search term is within a scored range associated with said navigation path; and
       direct said visitor along said navigation path.

17. A computer readable medium for use in a server hosting a World Wide Web site, the computer readable medium storing a computer program comprising:
    computer readable means for obtaining at least one search term from a visitor to a World Wide Web site;

computer readable means for associating each of a plurality of navigation paths with a respective one of a plurality of score ranges;

computer readable means for determining a score for said at least one search term;

computer readable means for determining a navigation path based, at least in part, on said at least one search term, wherein said navigation path is determined from said plurality of navigation paths and said score of said at least one search term is within a scored range associated with said navigation path; and computer readable means for establishing said navigation path for said visitor.

18. An apparatus for directing navigation of a visitor to a World Wide Web site, comprising:

means for obtaining at least one search term from a visitor to a World Wide Web site;

means for associating each of a plurality of navigation paths with a respective one of a plurality of score ranges;

means for determining a score for said at least one search term;

means for determining a navigation path based, at least in part, on said at least one search term, wherein said navigation path is determined from said plurality of navigation paths and said score of said at least one search term is within a scored range associated with said navigation path; and means for establishing said navigation path for said visitor.

19. A method for directing navigation of a visitor to a World Wide Web site, comprising:

receiving at least one search term from a visitor to a World Wide Web site;

selecting a navigation path based, at least in part, on said at least one search term, wherein said navigation path is selected from a plurality of navigation paths;

directing said visitor along said navigation path automatically;

establishing a rule that must be satisfied before said visitor can be directed along said navigation path; and determining if said at least one search term satisfies said rule.

20. A method for directing navigation of a visitor to a World Wide Web site, comprising:

receiving at least one search term from a visitor to a World Wide Web site;

associating each of a plurality of navigation paths to at least one of a plurality of combinations of search terms;

selecting a navigation path based, at least in part, on said at least one search term, wherein said navigation path is selected from a plurality of navigation paths and said navigation path is selected only if said at least one search term includes a combination of search terms associated with said navigation path; and directing said visitor along said navigation path automatically.

* * * * *